United States Patent [19]

Hirashita

[11] Patent Number: 4,915,198
[45] Date of Patent: Apr. 10, 1990

[54] FRICTION PAD SUPPORT MECHANISM FOR DISC BRAKE

[75] Inventor: Hiroshi Hirashita, Saitama, Japan

[73] Assignee: Akebono Brake Industry Co., Ltd., Tokyo, Japan

[21] Appl. No.: 95,368

[22] Filed: Sep. 3, 1987

[30] Foreign Application Priority Data

Sep. 3, 1986 [JP] Japan ............................ 61-135349[U]

[51] Int. Cl.⁴ .............................................. F16D 65/09
[52] U.S. Cl. ................................. 188/73.39; 188/205 R
[58] Field of Search ............... 188/73.31, 73.35, 73.37, 188/73.39, 205 R, 206 R

[56] References Cited

U.S. PATENT DOCUMENTS

| 3,924,711 | 12/1975 | Hoffmann et al. | 188/73.39 X |
| 4,068,744 | 1/1978 | Markert | 188/73.39 |
| 4,106,595 | 8/1978 | Kimura et al. | 188/73.39 X |
| 4,321,984 | 3/1982 | Burgdorf et al. | 188/73.39 |
| 4,580,664 | 4/1986 | Kondo | 188/73.39 X |
| 4,632,227 | 12/1986 | Méry et al. | 188/73.39 X |

FOREIGN PATENT DOCUMENTS

| 1907832 | 9/1970 | Fed. Rep. of Germany ... | 188/73.39 |
| 0024964 | 3/1978 | Japan | 188/73.39 |
| 0149631 | 9/1982 | Japan | 188/73.39 |

Primary Examiner—Duane A. Reger
Attorney, Agent, or Firm—Sughrue, Mion, Zinn, Macpeak & Seas

[57] ABSTRACT

A disc brake has a disc rotor, a pair of confronting friction pad assemblies arranged on both sides of the disc rotor, a pad assembly support member fixed to an automotive vehicle body, and a caliper driving piston for moving one of the friction pad assemblies relative to the other in an axial direction of the disc rotor. The pad assemblies are each provided with a pair of lower two engaging steps for transmitting the brake torques to the support member, and also with upper corner shoulders for transmitting the brake torques. The support member is provided with step portions corresponding to the engaging steps and the upper corner shoulders of the brake assemblies. Thus, it is possible to reduce or suppress a deformation of the brake assemblies when the disc rotor rotates upon the brake application.

6 Claims, 3 Drawing Sheets

FRICTION PAD SUPPORT MECHANISM FOR DISC BRAKE

BACKGROUND OF THE INVENTION

The present invention relates to a support mechanism for friction pads for disc brakes.

FIG. 1 shows a prior art friction pad support mechanism for a disc brake which is of the single cylinder floating caliper type, which comprises a support member 1 fixed to a vehicle body (not shown), a caliper body 2 and a pair of friction pads 3a and 3b. The friction pads 3a and 3b are arranged in opening portions 4 and 5 formed in an outer support portion 1a and an inner support portion 1b of the support member 1, respectively. The outer and inner support portions 1a and 1b are formed to embrace therebetween a disc rotor (not shown). The friction pad 3a has an engaging projection 6a at its end face on the rotational leading side of the disc rotor. When the disc rotor rotates in the direction indicated by the arrow (forward rotation), the engaging projection 6a is engaged with an associated recess 5 formed in the support member 1 so as to apply all the brake tangential forces to the recess 5 on the rotational leading side of the disc rotor. For the reverse rotation of the disc rotor, there are provided an engaging projection 6b and an associated recess 4.

Thus, when the disc rotor rotates in the forward direction, upon the application of the braking force, the friction pads 3a and 3b are depressed forwardly so that the friction pads 3a and 3b will be deformed in a corrugated condition along the tangential direction of the rotor. This would cause a local wear in a lining of each friction pad 3a, 3b and would also make undesired noises.

SUMMARY OF THE INVENTION

Accordingly, in order to overcome the above-noted defects, according to the present invention, there is provided a disc brake having a disc rotor, a pair of confronting friction pad assemblies arranged on both sides of the disc rotor, a pad assembly support member fixed to a vehicle body, and a drive means for drivingly moving one of the friction pad assemblies relative to the other in an axial direction of the disc rotor. The disc brake comprises first engaging means provided on a radially inward edge face of each of the friction pad assemblies for transmitting brake torques applied from the friction pad assemblies, the first engaging means including two locations arranged on both end portions of the radially inward edge face of each of the friction pad assemblies; first retaining means provided on the support member for receiving the brake torques from the first engaging means engagement with the first engaging means; second engaging means provided on a radially outward edge face of each of the friction pad assemblies for transmitting the brake torques applied from the friction pad assemblies, the second engaging means including two locations arranged on an upper corner portions of each of the friction pad assemblies; and second retaining means provided on the support member for receiving the brake torques from the first engaging means in engagement with the second engaging means and for restricting a radially outward movement of each of the friction pad assemblies.

DESCRIPTION OF THE PREFERRED EMBODIMENTS

The present invention will now be described with reference to FIGS. 2 to 6.

Figure 1:
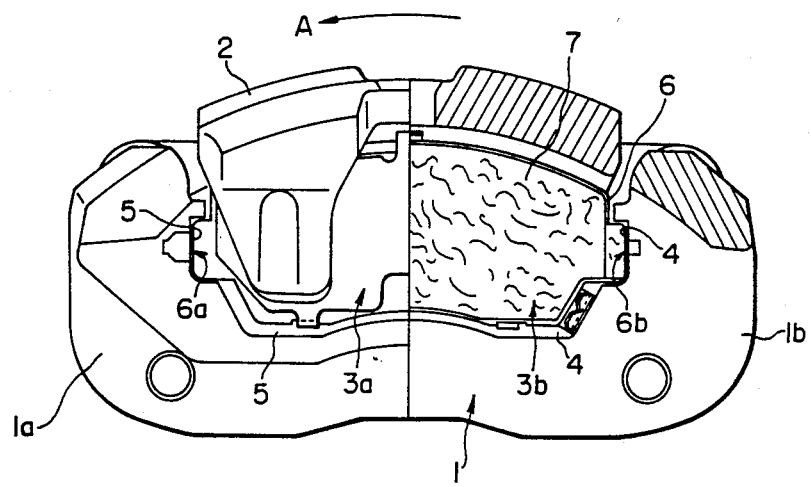
FIG. 1 is a half-fragmentary side elevational view showing a prior art friction pad support mechanism.
Figure 2:
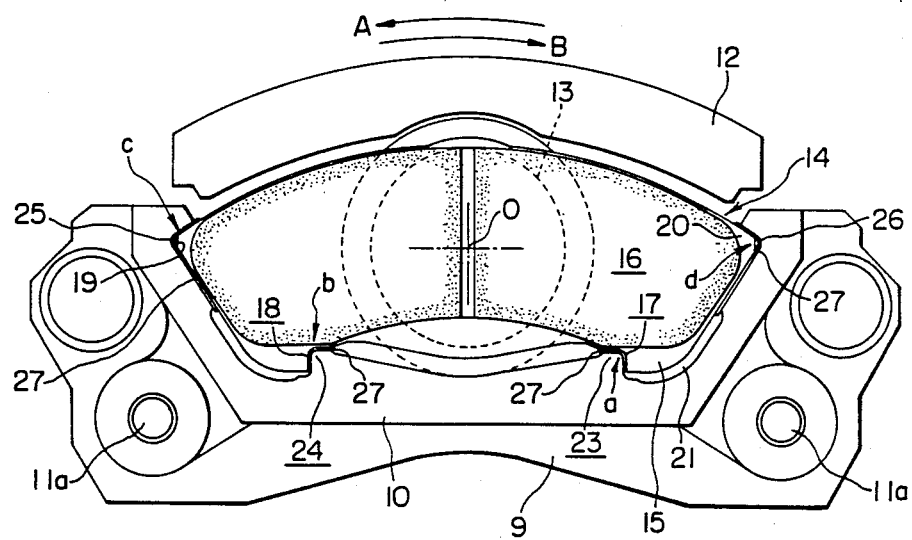
FIG. 2 is a side elevational view as viewed from a rotor disc, showing an inner side of a friction pad support mechanism according to the present invention.
Figure 3:
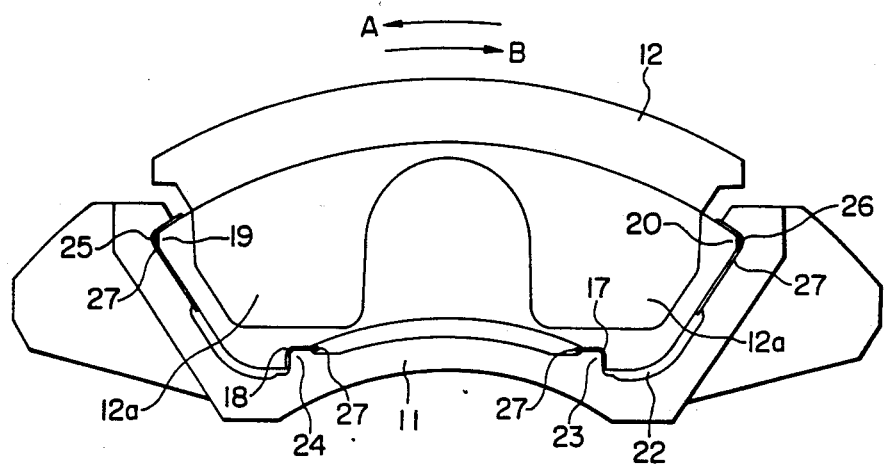
FIG. 3 is a side elevational view as viewed from the outer side, showing an outer side of the friction pad support mechanism shown in FIG. 2.

FIG. 2 shows a disc brake friction pad support mechanism in accordance with an embodiment of the invention. In FIG. 2, there is shown a friction pad support portion as viewed from the disc rotor side to the inner side. FIG. 3 shows a side elevational view showing the support mechanism as viewed from the outer side.

In FIGS. 2 and 3, a support member 9 having an inner bridge portion 10 and an outer bridge portion 11 is formed in an inverted U-shape so as to embrace a disc rotor (not shown). The support member 9 is mounted on a fixed portion of a vehicle (not shown) through screw holes 11a provided at both ends of the inner bridge 10. A piston 13 for pressing an inner side friction pad is provided in a caliper body 12. The caliper body 12 has a pair of claws 12a for pressing a friction pad 16 on the outer side. Reference numeral 14 denotes a friction pad assembly having a lining 16 fixed to a back plate 15. The back plate 15 of the friction pad assembly 14 is substantially in the form of a symmetric sector. A pair of engaging step portions 17 and 18 are formed at opposite end portions of a lower edge portion of the friction pad assembly 14 in faced relation with each other. At opposite end portions of an upper edge portion of the back plate 15, there are provided a pair of shoulder portions 19 and 20 each having an approximately right angle.

In the inner bridge portion 10 and the outer bridge portion 11, there are formed openings 21 and 22 in conformity with an outer configuration of the friction pad assemblies 14 for holding the friction pads 16, respectively. The inner and outer bridge portions 10 and 11 are engaged with the engaging step portions 17 and 18, thereby restricting the right and left movements of the back plate, that is, the friction pad. The brake forces transmitted from the friction pads 16 are thus applied to first retaining steps 23 and 24 of the inner and outer bridge portions. Also, on both the upper corner portions of the opening 21 of the inner bridge portion 10 and the opening 22 of the outer bridge portion 11, there are formed second retaining steps 25 and 26 for restricting the left and right movements and the up-and-down movements of the back plates 15, that is, the friction pads 16 in contact with the shoulder portions 19 and 20 of the back plate 16 and for receiving the brake forces applied from the friction pads 16. The second retaining steps 25 and 26 are provided substantially on a first line perpendicular to a second line connecting a pressure center O of the piston 13 and a rotational center of the disc rotor, the first line passing through the pressure center of the piston 13. Reference numeral 27 indicates pad guide plates each of which has a high anti-corrosion property and is disposed on an engaging surface between the friction pads 14 and the inner and outer bridge portions 10 and 11.

Figure 5:
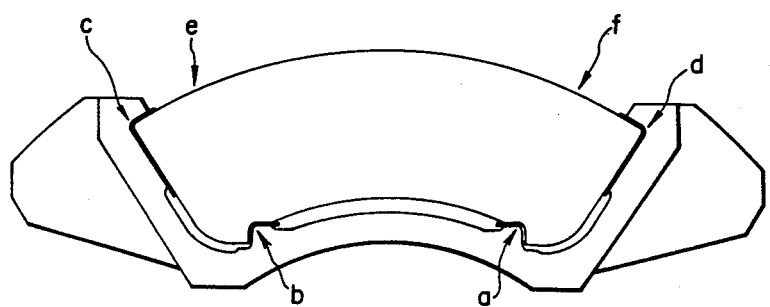
FIG. 5 is an illustration for the operation of the first anchor portions.
Figure 6A:
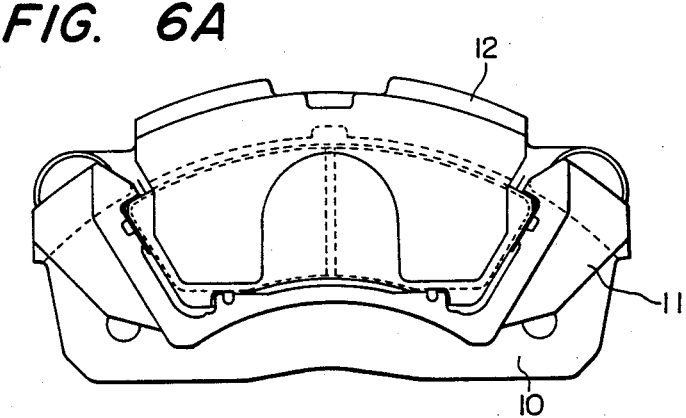
FIG. 6A is a side elevational view of a disc brake to which the present invention is applied.
Figure 6B:
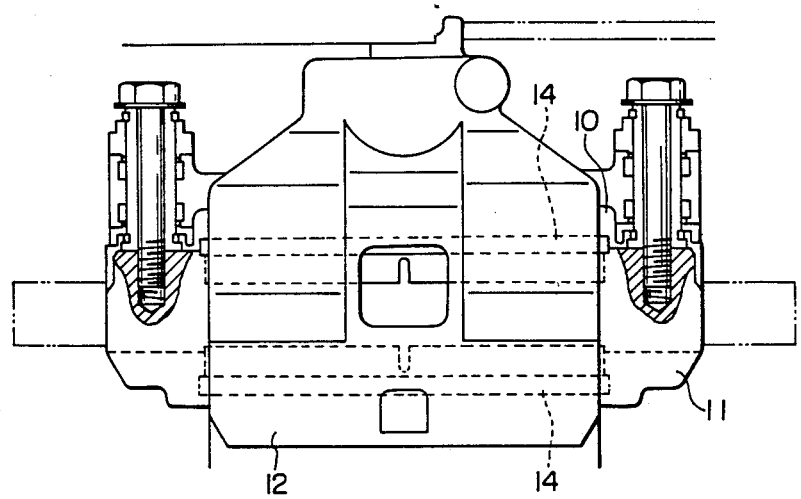
FIG. 6B is a plan view of the disc brake shown in FIG. 6A.
Figure 6C:
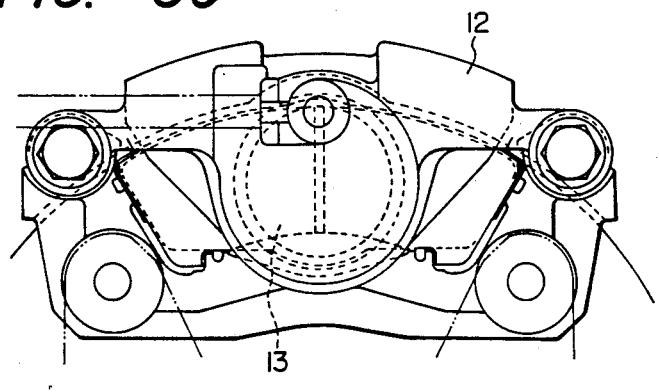
FIG. 6C is another side elevational view of the disc brake shown in FIG. 6A.

Before an explanation of the operation of the disc brake, the following definitions should be noted (FIG. 5). On each friction pad assembly 14, an engagement portion between the right engaging step 17 of the friction pad assembly 14 and the first retaining step portion 23 of the inner bridge portion 10 or the outer bridge portion 11 is referred to as a first anchor portion a. An engaging portion between the left engaging portion 18 and the left first retaining step portion 24 is referred to as a left first anchor portion b. An engagement portion between the left shoulder portion 19 of the friction pad assembly 14 and the left second retaining step portion 25 of the inner bridge portion 10 or the outer bridge portion 11 is referred to as a left second anchor portion c. An engagement portion between the right shoulder portion 20 and the right second retaining step portion 26 is referred to as a right second anchor portion d.

Figure 4:
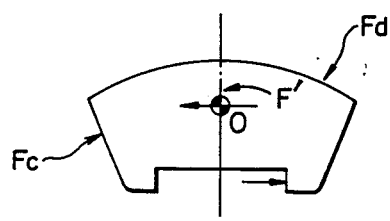
FIG. 4 is an illustration for reactive forces and rotational forces applied to the friction pad shown in FIGS. 2 and 3.

When a brake force is applied under the condition that the disc rotor is rotated in the direction indicated by A, the brake torques applied from the friction pads 14 are received by the right first anchor portions a and the left second anchor portions c of the bridge portions 10, 11 of the support member 9, respectively. Thus, the forces applied in the tangential direction of the friction pads 16 become tensile forces, thus preventing deformations of the friction pads 16. At this time, since the left second anchor portions c and the right second anchor portions d are located on the first line perpendicular to the second line connecting the pressure center O of the piston 13 and the rotational center of the disc rotor, the first line passing through the pressure center of the piston 13, the forces will be applied in a direction in which the rotational forces F' of the friction pads 16 are suppressed, as shown in FIG. 4, by the reaction forces Fc and Fd generated at the left and right second anchor portions c and d, thus preventing the rotation of the friction pads 16.

On the other hand, when the brake is effected under the condition that the disc rotor is rotated in the direction indicated by B, the brake torques applied from the friction pads 16 may be received by the left first anchor portions b and the right second anchor portions d. In the same manner as described above, the forces applied in the tangential direction of the friction pads 16 become tensile forces, thereby suppressing the rotation of the friction pads 16.

As described above, according to the present invention, the tangential forces applied to the friction pads 16 become the tensile forces, thus preventing any corrugations of the friction pads 16 and the generation of noises. Namely, the brake torques applied from the friction pads are received by the diametrically opposite end portions. It is therefore possible to disperse the brake torques to the desired portions of the support member. Thus, it is possible to suppress the deformation of the support member. As a result, it is possible to suppress wear of the lining portions of the friction pad assemblies. Even after a long service for a long period of time, the generation of noises may be prevented and also, a necessary stroke of the brake pedal would not be increased. The rigidity of the support member may be increased as follows:

(1) Since the first anchor portions of the inner bridge are located between the vehicle mounting portions of the support member (i.e., between the screw holes 11a), the rigidity of the support member against the tangential forces is extremely high.

(2) Since the tangential forces applied to the outer bridge are always supported at the disc rotor leading and trailing sides, there is a small deformation.

(3) Since the bridge portions of the support member may deform on the disc rotor leading and trailing sides to be close to each other, it is possible to disperse loads by providing the second anchor portions at the friction pad ends.

(4) Since the bridges are subjected to compression forces, it is possible to utilize the characteristics of the material tough against the compression, such as cast iron.

Also, since there is no portion that has a narrower width in the friction pad back plate, the deformation thereof would be small and there would be a small noise.

Furthermore, since the rotational forces applied to the friction pads may be suppressed only by the support member, any twist force would not be applied to the caliper body, and it is ensured to carry out a smooth operation of the caliper body upon the braking.

Also, since the first anchor portions a and b are located toward the inside of the friction pads, it is possible to make the outer configuration of the friction pads in a laterally extending shape. As shown in FIG. 5, the portions e and f where the vibration would be likely to generate may sufficiently be suppressed, thus preventing the noises.

As has been described above, according to the present invention, the brake torques applied from the friction pads are received at opposite end portions located on a diagonal line of the friction pads. Therefore, tensile forces will be applied to the friction pads as a whole to thereby prevent the local wear and the noises from generating.

I claim:

1. A disc brake having a disc rotor, a friction pad assembly engagable with said disc rotor, said friction pad assembly comprising a radially inward edge face and a radially outward edge face with respect to a radial direction of said disc rotor, a pair of side edges on opposite sides with respect to a circumferential direction of said disc rotor, a pad assembly support member fixed to a vehicle body, and a drive means for drivingly moving said friction pad assembly in an axial direction of said disc rotor, said disc brake comprising:

first engaging means provided on said radially inward edge face of said friction pad assembly for transmitting brake torque applied from said friction pad assembly, said first engaging means being disposed on both end portions of said radially inward edge face of said friction pad assembly;

first retaining means provided on said support member for receiving said brake torque from said first engaging means in engagement with said first engaging means;

second engaging means provided on a radially outward portion of said friction pad assembly for transmitting the brake torque applied from said friction pad assembly, said second engaging means being disposed on both end corners of said radially outward portion of said friction pad assembly;

said second engaging means including radial engaging faces formed on said pair of side edges of said friction pad assembly, and circumferential engaging faces formed on said radially outward edge face of said friction pad assembly, in spaced relation to each other in the circumferential direction of said disc rotor, said radial engaging faces of said second engaging means extending, respectively, in the radial direction of said disc rotor; and second retaining means provided on said support member, said second retaining means including radial retaining faces spaced in the circumferential direction of said disc rotor from each other, for receiving said brake torque, and circumferential retaining faces provided radially outward from said disc rotor in spaced relation to each other in the circumferential direction of said disc rotor, for suppressing motion of said friction pad assembly in the radially outward direction of said disc rotor, said radial retaining faces of said support member extending in the radially outward direction of said disc rotor, said radial engaging faces and said circumferential engaging faces of said friction pad assembly being located corresponding to and in confronted relation to said radial retaining faces and said circumferential retaining faces, respectively, of said support member.

2. A disc brake according to claim 1, wherein said second engaging means is located radially outward of said disc rotor with respect to said first engaging means, said second engaging means being located substantially on a first line perpendicular to a second line which connects together a driving pressure center of said drive means and a rotational center of said disc rotor, and said first line passing through said driving pressure center of said drive means.

3. A disc brake according to claim 1, wherein said radial engaging faces adjacent to said circumferential engaging faces.

4. A disc brake according to claim 1, wherein said radial engaging faces and said circumferential engaging faces form a substantially right angle.

5. A disc brake according to claim 1, wherein, upon braking, an engagement portion between said first engaging means and said first retaining means and an engagement portion between said radial engaging face and said radial retaining face, are located substantially on a diagonal line of said friction pad assembly.

6. A disc brake according to claim 1 wherein said first engaging means include vertical faces.

* * * * *